(12) United States Patent
Dos Santos Ribeiro et al.

(10) Patent No.: US 11,440,705 B2
(45) Date of Patent: Sep. 13, 2022

(54) CAPSULE FOR FLANGED CORK STOPPER, CAPSULATED STOPPER COMPRISING SAID CAPSULE AND PRODUCTION PROCESS OF THE CAPSULATED STOPPER

(71) Applicant: AMORIM CORK RESEARCH, LDA, Mozelos VFR (PT)

(72) Inventors: Ricardo Manuel Correia Dos Santos Ribeiro, Vila Nova de Gaia (PT); Sarah Lagorsse De Ribeiro Pontes, Oporto (PT)

(73) Assignee: AMORIM CORK RESEARCH, LDA, Mozelos VFR (PT)

( * ) Notice: Subject to any disclaimer, the term of this patent is extended or adjusted under 35 U.S.C. 154(b) by 384 days.

(21) Appl. No.: 16/612,440

(22) PCT Filed: May 9, 2018

(86) PCT No.: PCT/PT2018/050017
§ 371 (c)(1),
(2) Date: Nov. 11, 2019

(87) PCT Pub. No.: WO2018/208183
PCT Pub. Date: Nov. 15, 2018

(65) Prior Publication Data
US 2020/0115114 A1    Apr. 16, 2020

(30) Foreign Application Priority Data
May 10, 2017   (PT) .......................... 110068

(51) Int. Cl.
*B65D 39/00*   (2006.01)
*B65D 39/16*   (2006.01)
(Continued)

(52) U.S. Cl.
CPC .......... *B65D 39/0011* (2013.01); *B65D 39/16* (2013.01); *B29L 2031/56* (2013.01);
(Continued)

(58) Field of Classification Search
CPC ............ B65D 39/0058; B65D 39/0011; B65D 39/16; B65D 41/28; B65D 41/02; B65D 51/24; B67B 7/06; B67B 7/02
(Continued)

(56) References Cited

U.S. PATENT DOCUMENTS 2,072,592 A * 3/1937 Fay ........................ B65D 39/16
                                                            215/364
2,365,598 A * 12/1944 Rubin .................. B65D 51/248
                                                            215/355
(Continued)

FOREIGN PATENT DOCUMENTS

EP    1772420 A1   4/2007
FR     803505 A   10/1936
(Continued)

OTHER PUBLICATIONS

International Search Report, PCT/PT2018/050017 dated Jul. 26, 2018.

*Primary Examiner* — Robert J Hicks
(74) *Attorney, Agent, or Firm* — Porzio Bromberg & Newman P.C.

(57) ABSTRACT

The invention relates to a capsule (1) for a flanged cork stopper, the capsule (1) having a body (2) comprising a top (3) and a cavity (4) inside which at least two anti-rotation splines (5) are arranged, and the capsule further comprising an axial retention chamber (6) disposed within said cavity (4), wherein retention chamber (6) is shaped to receive and axially retain a flange of a flanged cork stopper. The invention also relates to a capsulated stopper comprising a flanged
(Continued)

stopper, the flange of which is attached to the capsule (1) of the invention. The invention further relates to the production process of said capsulated stopper.

11 Claims, 3 Drawing Sheets

(51) Int. Cl.
    *B29L 31/56*     (2006.01)
    *B65D 41/28*     (2006.01)
    *B67B 7/06*     (2006.01)

(52) U.S. Cl.
    CPC ........ *B65D 41/28* (2013.01); *B65D 2539/003* (2013.01); *B65D 2539/008* (2013.01); *B67B 7/06* (2013.01)

(58) Field of Classification Search
    USPC ........ 215/364, 355, 228; 220/804, 803, 802, 220/801, 789, 780, 212
    See application file for complete search history.

(56) References Cited

U.S. PATENT DOCUMENTS

| | | | | |
|---|---|---|---|---|
| 2,696,319 | A | * | 12/1954 | Menefee ............ B65D 39/0094 215/364 |
| 2,851,153 | A | * | 9/1958 | Carison ................. B65G 21/14 198/813 |
| 5,803,285 | A | * | 9/1998 | Hirota .................... B65D 39/16 215/296 |
| 2017/0021985 | A1 | * | 1/2017 | dos Santos Sobreira .................... B65D 39/16 |

FOREIGN PATENT DOCUMENTS

| | | | | |
|---|---|---|---|---|
| GB | 640216 | A | * | 7/1950 ............. B65D 39/16 |
| GB | 659632 | A | | 10/1951 |
| WO | 2014170286 | A1 | | 10/2014 |

* cited by examiner

CAPSULE FOR FLANGED CORK STOPPER, CAPSULATED STOPPER COMPRISING SAID CAPSULE AND PRODUCTION PROCESS OF THE CAPSULATED STOPPER

FIELD OF THE INVENTION

The present invention relates to a capsule to be attached to a cork stopper having a flange. The invention further relates to a capsulated stopper comprising said capsule and the capsulated stopper production process.

BACKGROUND OF THE INVENTION

Cork stoppers to cap or seal containers, in particular wine bottles, are used since the 18th century, and are widely distributed through the market. In general, there were no alternative to cork stoppers until sealing caps of plastic material emerge in the mid-90s of the twentieth century.

In yet another group, there are found stoppers generally used in bottles of spirit drinks, known as "Bartop" stoppers, which have a cork body and a capsule which is generally of another material, such as plastic, glass or wood.

"Bartop" stoppers are essentially used for the purpose of capping the container, which is why they are not normally usable in still wine bottling, which requires higher sealing levels than those provided by these stoppers. "Bartop", when applied into a bottle, do not require radial compression by an auxiliary tool, whereby bottling can be done using only a mechanical or manual force along the longitudinal direction (also referred to as axial direction), from the outside to the inside of the container, which will insert the stopper into the neck of the container until it hits the capsule. The capsule lies on the outside of the container to facilitate a subsequent opening, without the need of a corkscrew device to be withdrawn.

The construction of these "Bartop" stoppers is well known and comprises a capsule having a substantially cylindrical shape, having a cavity and a side wall, and a top surface closing the upper end of the capsule. The lower end of the capsule is wholly or partly open, defining a cavity, so as to receive and accommodate an end of a cylindrical cork stopper which can thus be attached to the capsule. On the inner side wall of the capsule there may be splines oriented in an axial direction of the cylinder defined by the capsule. The assembly of the cylindrical cork stopper is relatively simple, wherein it would suffice inserting one end thereof into the lower aperture of the capsule and pushing the stopper until the flat surface of the inserted end of the stopper abuts the inner (also flat) top surface of the capsule. The stopper is secured by bonding the contacting surfaces on the upper (and inner) portion of the capsule, the splines being in contact with the inserted part of the side wall of the stopper.

To remove a "Bartop" stopper from the bottle, the consumer applies combined forces of rotation (radially in relation to the stopper) and traction (axially in relation to the stopper) on the capsule, which forces are transmitted to the cylindrical cork body (9) which is inserted into the neck of the bottle, which ejects the capsulated cap of said neck. These combined tensile and rotational forces are essentially counteracted by the glue attaching the flat transverse surface of the end of the cylindrical cork stopper body to the inner top surface of the capsule.

The use of adhesives for attaching the cylindrical body of cork to the capsule has already proven to be an effective method under certain conditions of use but under extreme conditions it is found that its effectiveness may be compromised. In fact, for very high temperatures and humidity, for example, the most common adhesives lose adhesion, causing peeling off or defects to occur in the final product.

On the other hand, if one wishes to use "Bartop" stoppers in still wines and taking into account how the latter are accommodated (stored in lying down bottles), there is a probability of the occurrence of liquid absorption phenomena through the stopper, and consequently the direct contact of the wine with the adhesive of the capsulated stopper. Although the adhesives are food grade and not constitute any risk to the consumer, this situation is not desirable as the sensory quality of the wine sealed by these stoppers may be adulterated.

Furthermore, the use of adhesive for attaching the cylindrical body of cork to the capsule also limits the range of coatings and/or surface treatments to be applied on said cork body. A large part of such coating products, such as silicone elastomers, have a very low surface tension and consequently little or no adhesion to the adhesive. Therefore, by using a glue-free coupling, it would be possible to increase the range of coatings and/or surface treatments available for the production of cork stoppers, both for spirits drinks and still wines.

There is thus a need in the art for an improved capsulated stopper of the "Bartop" type for sealing food product containers, for example bottles of still wine, which allow both to eliminate the need of chemical adhesive in its production/design and to withstand combined tensile and rotational forces required to remove it from the container.

Accordingly, there is a need in the art for a capsule which enables a merely mechanical coupling to a cork stopper body and which ensures a force able to withstand combined tensile and rotational forces and which is at least identical to the one found in the capsules of the prior art using chemical adhesion attaching.

SUMMARY OF THE INVENTION

This invention relates to a capsule (1) for a flanged cork stopper, the capsule (1) having a body (2) comprising a top (3) and a cavity (4), inside which at least two anti-rotation splines (5) are arranged, characterized in that it further comprises an axial retention chamber (6) disposed within said cavity (4), wherein retention chamber (6) is shaped to receive and axially retain a flange of a flanged cork stopper.

Retention chamber (6) of capsule (1) comprises a chamber top (6a) and a chamber bottom (6b).

In one embodiment, chamber top (6a) and chamber bottom (6b) are opened and defined, respectively, as a top flap and a bottom flap.

In another embodiment, chamber top (6a) is closed and chamber bottom (6b) is opened and defined as a bottom flap.

In yet another embodiment, chamber top (6a) of the retention chamber (6) matches with the top (3) of the capsule body (2).

In a preferred embodiment, said anti-rotation splines (5) are disposed within said retention chamber (6).

In an alternative embodiment, said anti-rotation splines (5) are disposed outside said retention chamber (6).

The anti-rotation splines (5) may be parallel to one another or may be arranged so that two splines (5) form an obtuse angle or an acute angle with each other.

In one particular embodiment, the capsule according to the invention further comprises a thread disposed within said cavity (4) of the capsule body (2).

The invention also relates to a capsulated stopper (7) to be used in containers, in particular bottles, the capsulated stopper (7) comprising a cork stopper (8) having a cylindrical body (9) and a flange (10); and a capsule (1) of the invention attached to flange (10) of said cork stopper (8).

In one embodiment of the capsulated stopper (7), it comprises a cork stopper (8) whose flange (10) is situated at one end of its cylindrical body (9).

In an alternative embodiment, the capsulated stopper (7) comprises a cork stopper (8) whose flange (10) is disposed in a portion situated between both ends of cylindrical body (9).

The invention further relates to the production process of said capsulated stopper (7), which process comprises a step of placing a flange (10) of a cork stopper (8) within an axial retention chamber (6) of a capsule (1) according to the invention.

BRIEF DESCRIPTION OF THE DRAWINGS

The following is a detailed description of the invention with reference to the accompanying drawings in which.

DETAILED DESCRIPTION OF THE INVENTION

Figure 1:
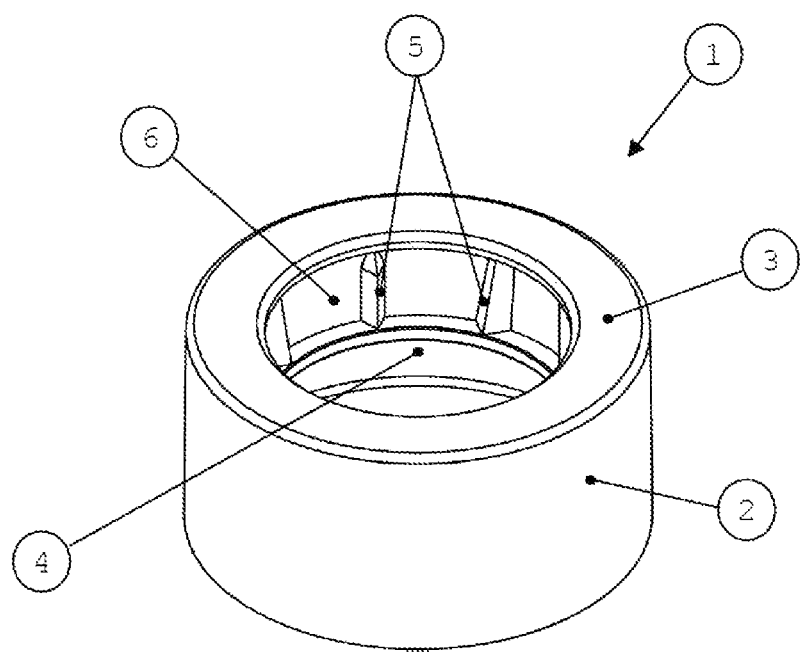
FIG. 1 is a perspective view of one embodiment of the capsule according to the invention.

The present invention relates to a capsule to be attached to a cork stopper having a flange. The invention also relates to a capsulated stopper comprising said capsule and the capsulated stopper production process.

The terms "understand", "having", "include", "contain" and their various verbal forms shall be construed as broad terms, i.e., meaning, for example, "including but not limited to", unless otherwise specified by use of the term "consist" or a verbal form thereof.

In the context of the present invention, the term "container" refers to an object having a closed shape, generally of a globular body, with a mouth or neck, for receiving a food or non-food product.

The capsulated stopper comprising the capsule of the present invention is intended to containers. In particular, but not exclusively, it is intended for food containers, in particular beverage containers, for example, bottles for beverages selected from the group comprising wine, beer, spirits, water, soft drinks and the like. Naturally, the capsulated stopper of the invention may also be used in containers for non-food products, as the nature of the stopper is not limited by the type of container that the stopper may close, cap or seal, nor by the product contained in such container.

The term "container mouth" refers to the open portion of a container, for example, a bottle neck. In the present description, for the purposes of explanatory simplification and reading thereof, reference is made to the examples of "bottle" and "neck", without this simplification being intended to limit the use of the capsule and capsulated stopper of the invention to such elements.

The term "capsulated stopper" of the present invention relates to a system constituted by a flanged cork stopper attached to a capsule of the invention.

The term "flanged cork stopper" refers to a cork stopper comprising a cylindrical body and a flange. Such a flanged cork stopper is used as one of the components of the capsulated stopper system of the invention.

The term "cork stopper" refers to a natural cork stopper, colmated natural cork, agglomerated cork, micro-agglomerated cork or combinations thereof. The same term also refers to composite stoppers, the majority comprising cork material associated with another compatible material, for example, polymeric material, fibres or combinations thereof.

In the context of the present description, a natural cork stopper is a stopper comprising a body formed only of natural cork. Colmated natural cork stopper is a natural cork stopper with pores filled with cork powder. Agglomerated cork stopper is a stopper comprising a body formed of agglomerated cork with a particle size greater than or equal to 2 mm. Micro-agglomerated cork stopper is a stopper comprising a body formed of micro-agglomerated cork, that is, with a particle size of less than 2 mm.

The term "cylindrical body" refers to the body of said flanged cork stopper, which body has a substantially cylindrical or conical shape with two ends. One of such ends can be chamfered or rounded and is intended to be inserted partially or totally into the mouth or neck of a container, and the opposite end may comprise said flange or this one may be disposed on a portion of the cylindrical body between the ends thereof.

Figure 3:
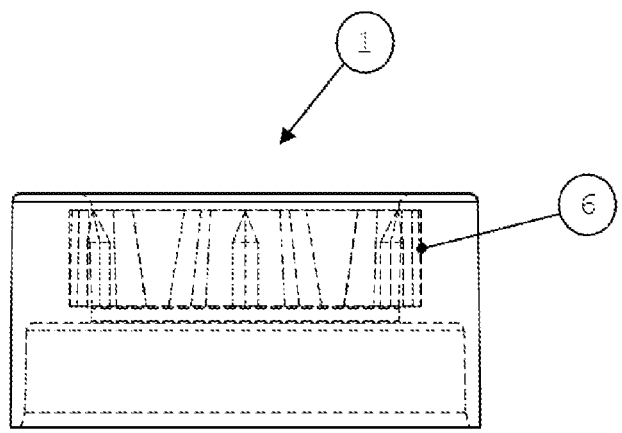
FIG. 3 is a side view of the capsule of FIGS. 1 and 2, schematically showing the construction of the capsule in its cavity.

The term "flange" refers to a collar or flap formed integrally in the cork stopper from the same material thereof. The flange is normally disposed at one end of the cylindrical body of the flanged cork stopper, as shown in FIG. 3, but it may also be disposed in a portion of the cylindrical body between the ends thereof (not shown), the radial dimension of the flange being in any case bigger than the radial dimension of the cylindrical body. The flange is the integral part of the flanged cork stopper which serves to attach the latter to a capsule of the invention, forming a capsulated stopper in accordance with the present invention. The flange may adopt any shape appropriate to the function mentioned such as, for example, the shape of a cylinder having a diameter greater than the diameter of said cylindrical body. However, circular disk or flap shapes are preferred, these shapes being continuous or transversely sectioned.

The "capsule" of the present invention is the member of the capsulated stopper which is attached to the flange of a flanged cork stopper and which, in use, after bottling, is disposed outside a capped or closed/sealed container by the capsulated stopper, the capsule being covering the free end of the container neck, and said cylindrical portion of the cork stopper being inserted into the neck to cap it or closing/sealing it.

The capsule is the member of the capsulated stopper serving for being manipulated by the user/consumer in order to remove the capsulated stopper from the neck of a container without requiring mechanical tools such as corkscrews, and further allowing a purely manual reuse.

The capsule also provides the capsulated stopper with an important aesthetic advantage over conventional stoppers without a capsule.

The capsule of the invention can be manufactured from any suitable material such as glass, wood, metal, polymeric material, composite material or combinations thereof. The use of polymeric materials, in particular plastic material, is preferred.

Figure 4:
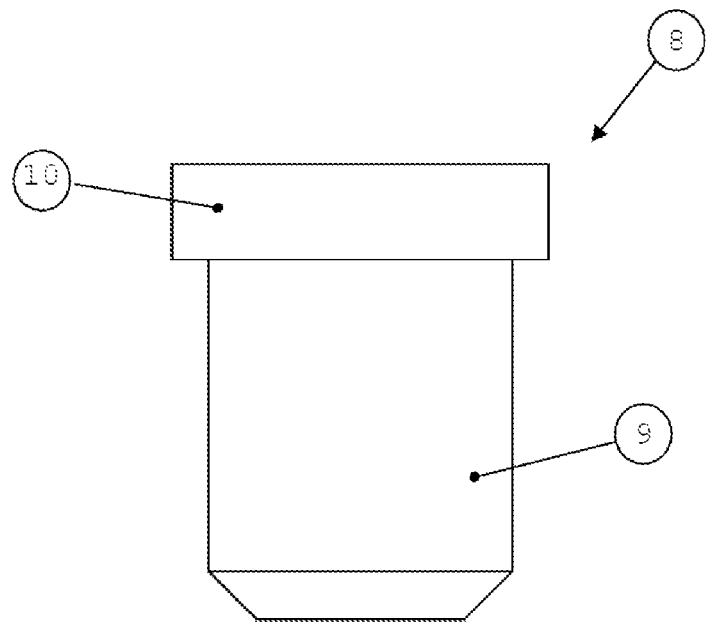
FIG. 4 is a schematic side view of a flanged cork stopper.

The capsule (1) of the invention is designed to be attached to a flanged cork stopper (8) (schematically and exemplarily shown in FIG. 4). This capsule (1) is not suitable to be combined with conventional cork stoppers free of a flange.

The present invention eliminates the need of chemical adhesives in the attaching between the capsule and the body of the cork stopper, which provides the development of long term stable stoppers of the type "Bartop" to be applied, for example, to still wines subjected to severe conditions of packaging and shipping. It further allows the use of coatings or surface treatments normally used in conventional wine corks but not able to be used in "Bartop" stoppers of the state of the art.

In this way, an improved long-term performance is ensured, which fulfils the requirements for shipping, storage and consumption of still wines, contributing to improve the stability of the still wine under conditions of packaging and shipping normally not recommended for this product when in association with the "Bartop" stoppers of the state of the art.

Figure 2:
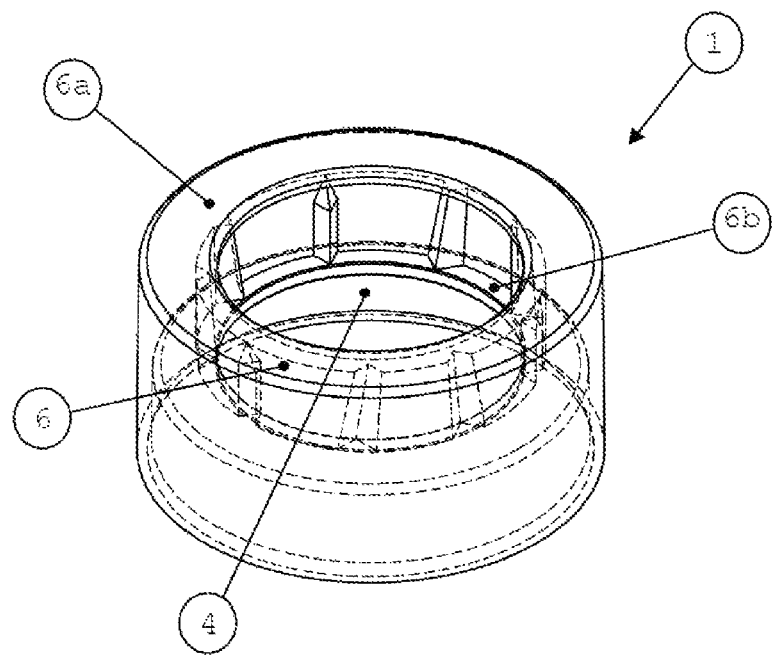
FIG. 2 is a schematic representation of the capsule of FIG. 1, showing the construction of the capsule in its cavity.

Referring to FIGS. 1 through 3, capsule (1) has a body (2) comprising a top (3) and a cavity (4) inside which at least two anti-rotation splines (5) are arranged. The capsule (1) further comprises an axial retention chamber (6) disposed within said cavity (4). The retention chamber (6) is shaped to receive and axially retain (that is, along a longitudinal axis substantially perpendicular to a radial axis of the capsule and the flanged stopper) a flange of a flanged cork stopper.

As can be seen in FIG. 2, capsule (1) according to the invention comprises a chamber top (6a) and a chamber bottom (6b). In the embodiment shown in FIGS. 1 and 2, chamber top (6a) and chamber bottom (6b) are opened and defined, respectively, as a top flap and a bottom flap. Both flaps define stops for a flange (10) of a flanged cork stopper (8) (such as in the example of FIG. 4), which flange (10), upon being attached to capsule (1), remains inserted into the capsule retention chamber (6) and is prevented from moving axially relative thereto.

In a not illustrated embodiment, chamber top (6a) of retention chamber (6) is closed, and chamber bottom (6b) is opened and defined as a bottom flap. In this embodiment, in the attaching step of flanged cork stopper (8) into capsule (1), flange (10) of stopper (8) is inserted into the chamber from the opening defined by the bottom flap (6b) thereby being prevented from moving axially relative to chamber (6) by means of the closed top (6a) and the bottom flap (6b) of chamber (6). The process of attaching flanged cork stopper (8) to capsule (1) is described in more detail below.

In a particular embodiment, chamber top (6a) matches with top (3) of capsule body (2), resulting in a single construction member of capsule (1). Of course, in such a case, chamber top (6a) (and consequently top (3) of capsule body (2)) may be opened or closed depending on the constructive option of the skilled person. This is the case of the embodiment illustrated in FIGS. 1 and 2, wherein the top (3) of the capsule is opened and delimited by the flap illustrated in these figures and denoted (6a). In this embodiment, the attaching of the flanged cork stopper (8) is performed from this top opening.

It should be noted that said bottom (6b) of retention chamber of capsule (1) will always be open, the constructive configuration adopted to define its flap or collar being the only thing able to vary. If this was not the case, it would not be possible to construct a capsulated stopper (7) (see FIG. 5) using a mechanical coupling between a flanged cork stopper (8) and the capsule in the step of production of capsulated stopper (7).

In the preferred embodiment, in FIGS. 1 through 3, capsule (1) comprises anti-rotation splines (5) arranged within retention chamber (6). This design provides a compact and optimized solution as it allows to withstand combined forces of traction (axial forces) and rotation (radial forces) at least identical to the solutions of the state of the art.

In an embodiment not shown, said anti-rotation splines (5) are disposed outside said retention chamber (6). In this case, the splines are disposed on a portion of cavity (4) of capsule (1) between the top (3) of capsule body (2) and the top (6a) of retention chamber. Capsule (1) of this embodiment is designed to be attached to a flanged stopper (8), the flange (10) of which is disposed in a portion of cylindrical body (9) between the ends thereof.

In either case, anti-rotation splines (5) function is to prevent relative rotational movements of capsule (1) in relation to cylindrical body (9).

Anti-rotation splines (5) may be disposed parallel to each other or alternatively may be arranged such that two adjacent splines (5) form an obtuse angle or an acute angle with each other. The non-parallel arrangement of splines (5) provides an improved anti-rotation effect over the parallel arrangement of splines (5).

In another non-illustrated embodiment, capsule (1) of the present invention further comprises a thread disposed within cavity (4) of capsule body (2). Such thread allows to provide a capsulated stopper (7) using capsule (1) with an additional function of screwing it to a neck of a container suitably shaped to receive such a stopper. Such solution may find application in containers of non-food products or even in bottles of spirit drinks.

Figure 5:
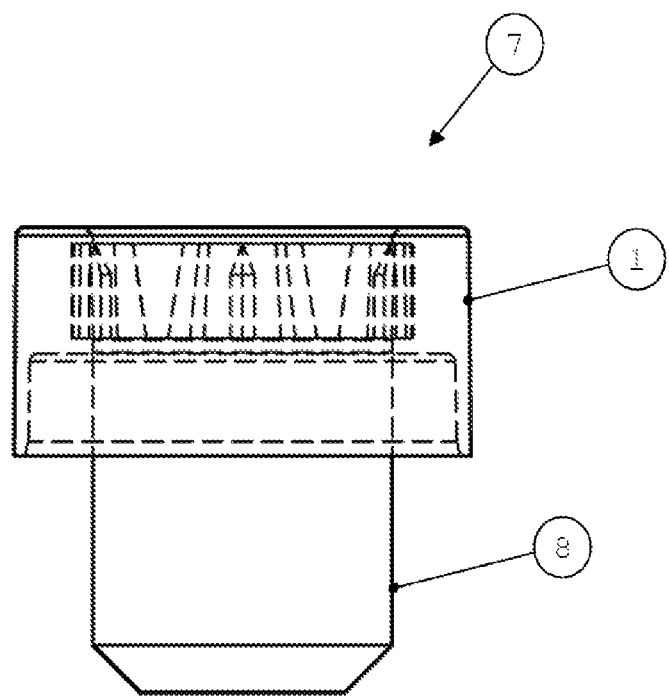
FIG. 5 schematically illustrates in a side view a capsulated stopper according to the present invention, which was constructed from the coupling of the capsule of FIGS. 1 through 3 with the flanged cork stopper of FIG. 4.

With particular reference to FIG. 5, the present invention also relates to a capsulated stopper (7) for containers, in particular bottles.

The capsulated stopper (7) of the invention comprises:
a cork stopper (8) having a cylindrical body (9) and a flange (10), and
a capsule (1) of the invention, as defined above, attached to flange (10) of said cork stopper (8).

As already mentioned, flange (10) of cork stopper (8) may be situated at one end of the cylindrical body (9) of the same cork stopper (8) or may be disposed in a part situated between both ends of cylindrical body (9). For the second case, a capsule (1) having a part of its cavity (4) between top (3) of capsule body (2) and top (6a) of the retention chamber, available for housing a remaining portion of cylindrical body (9) between the flange and one end of same body (9), must be used.

The invention further relates to the production process of the capsulated stopper (7) described above. The process comprises placing a flange (10) of a flanged cork stopper (8) into an axial retention chamber (6) of a capsule (1) of the invention.

To place the flange (10) of a flanged cork stopper (8) into axial retention chamber (6), it is necessary to axially insert the cylindrical body (9) of flanged stopper (8) through chamber top (6a) or chamber bottom (6b) until flange (10) is reached. As previously mentioned, chamber bottom (6b) is opened and sized so as to allow a free (axial) passage of cylindrical body (9) of stopper (8) but not of flange (10).

In the case where it is desired to insert flanged stopper (8) through chamber top (6a), the latter should also be sized to have an aperture of a size suitable to let cylindrical body (9)

of stopper (8) pass, but not the flange (10). Thus, during axial insertion of stopper (8), the chamber top (6*a*) allows cylindrical body (9) to pass into retention chamber (6). When flange (10) reaches top (6*a*), it must be radially compressed so that it can also pass through the aperture. Such radial compression is achieved by means of a mechanical device which is not a subject of the invention and will not be described herein. When flange (10) passes through chamber top (6*a*), said radial compression ceases, and flange (10) regains its original shape occupying the interior space of axial retention chamber (6), which is shaped to receive and retain said flange (10) of cork stopper (8), as both chamber top (6*a*) and chamber top (6*b*) are designed to prevent axial displacement of flange (10) and hence of flanged cork stopper (8).

The use of retention flaps as embodiments of the top (6*a*) and chamber bottom (6*b*) constitutes the preferred embodiment for providing the necessary axial constraint to flange (10) of cork stopper (8) after the production of capsulated stopper (7).

When splines (5) are provided within capsule retention chamber (6), the force of expansion of flange (10) which occurs (by elastic recovery thanks to shape memory of the cork material) when it enters into chamber (6) causes the flange (10) to occupy the available free space therein and simultaneously provides compressive stresses on the contact points with splines (5), respectively preventing relative movements of radial displacement and rotation between capsule (1) and flange (10) of the cork stopper (8).

The same principles are applied when it is desired to insert the flange (10) of the cork stopper (8) into the retention chamber (6) through the open chamber bottom (6*b*). In this case, top (3) of the capsule and top (6*a*) of the retention chamber can be closed and even coincident in a single element.

It should be noted that the cork material constituting the flanged stopper (8) is suitable for the production process of the capsulated stopper (7), as the flexible nature thereof provides the necessary compression and expansion characteristics, respectively for insertion into the retention chamber (6) of capsule (1) and subsequent occupation of the free space of the same chamber (6) for axial retention of the flanged stopper (8).

The capsulated stopper (7) thus produced does not require the application of chemical adhesion elements between the capsule and the cork stopper, providing a merely mechanical solution more environmentally friendly, more convenient for food containers and which withstands removal forces at least identical to those found in prior art "Bartop" stoppers.

The disclosure herein should be understood as exemplifying and not limiting the scope of the present invention, which is set forth in the appended independent claims, the dependent claims serving to set forth particular embodiments of the invention.

The invention claimed is:

1. A capsule for a flanged cork stopper, the capsule having a body comprising a top and a cavity, inside which at least two anti-rotation splines are arranged, wherein the capsule further comprises an axial retention chamber disposed within said cavity, wherein said retention chamber is shaped to receive and axially retain a flange of the flanged cork stopper and said retention chamber comprises a chamber top and a chamber bottom, wherein said chamber top and said chamber bottom are opened and defined, respectively, as a top flap and a bottom flap.

2. The capsule according to claim 1, wherein said chamber top matches with the top of said capsule body.

3. The capsule according to claim 1, wherein said anti-rotation splines are disposed within said retention chamber.

4. The capsule according to claim 1, wherein said anti-rotation splines are parallel to one another.

5. The capsule according to claim 1, wherein said anti-rotation splines are arranged so that two of the anti-rotation splines form an obtuse angle or an acute angle with each other.

6. The capsule according to claim 1, further comprising a thread disposed within said cavity of the capsule body.

7. A capsulated stopper to be used in a container comprising:
    a cork stopper having a cylindrical body and a flange, and
    a capsule as claimed in claim 1 attached to said flange of said cork stopper.

8. The capsulated stopper according to claim 7, wherein said flange is disposed at one end of said cylindrical body of the cork stopper.

9. The capsulated stopper according to claim 7, wherein said flange is disposed in a portion situated between both ends of cylindrical body of the cork stopper.

10. The capsulated stopper of claim 7 wherein the container is a bottle.

11. A production process of a capsulated stopper, comprising a step of placing a flange of a flanged cork stopper within an axial retention chamber of a capsule as claimed in claim 1 wherein the flanged cork stopper is inserted into the axial retention chamber through the chamber top of the capsule.

* * * * *